(No Model.) 2 Sheets—Sheet 2.
S. H. WOODBURY.
SOLE MOLDING MACHINE.
No. 268,589. Patented Dec. 5, 1882.
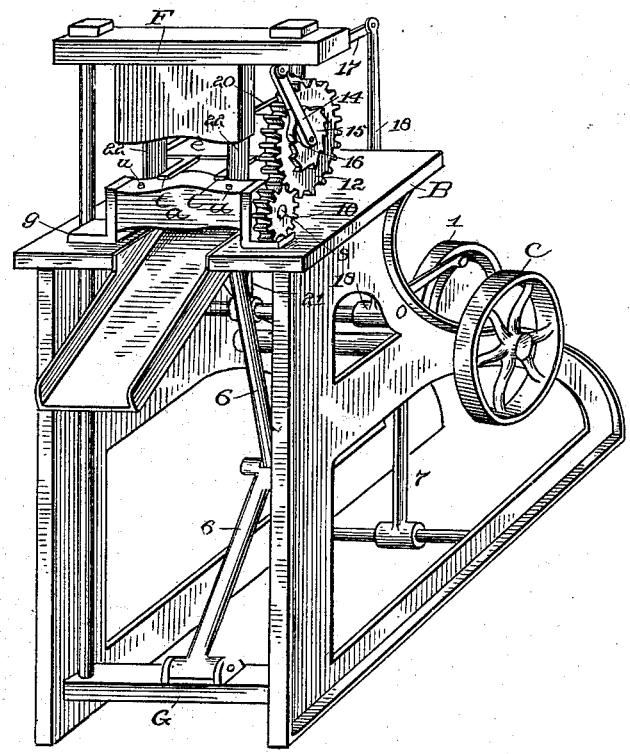

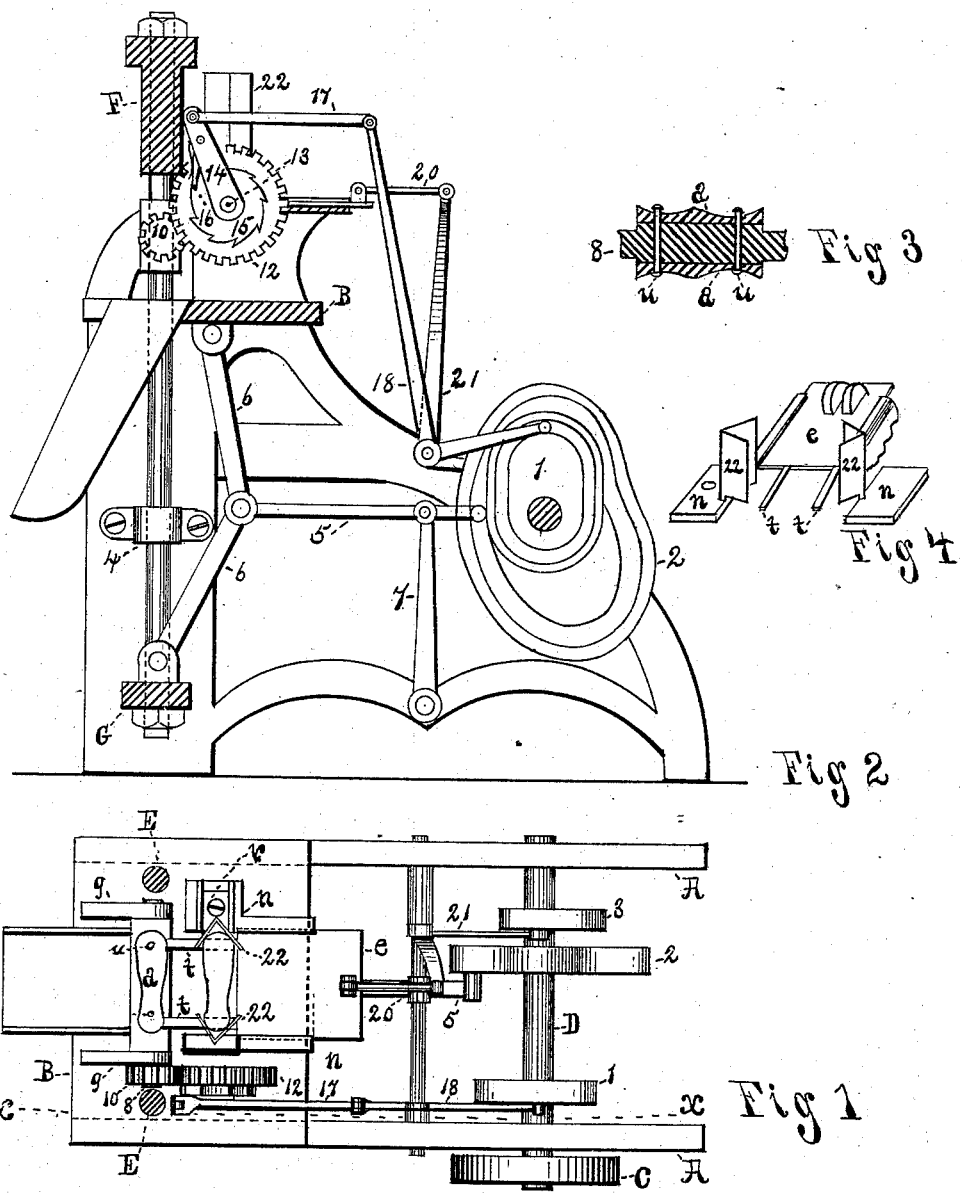

UNITED STATES PATENT OFFICE.

SETH H. WOODBURY, OF LYNN, MASSACHUSETTS.

SOLE-MOLDING MACHINE.

SPECIFICATION forming part of Letters Patent No. 268,589, dated December 5, 1882.

Application filed April 6, 1882. (No model.)

*To all whom it may concern:*

Be it known that I, SETH H. WOODBURY, of Lynn, in the county of Essex and Commonwealth of Massachusetts, have invented certain new and useful Improvements in Sole-Molding Machines, of which the following, taken in connection with the accompanying drawings, is a specification.

This invention relates to an improvement in sole-molding machines, and has for its object to produce a machine for molding soles which shall be self-feeding and automatic in its movements.

It consists in the combination, with the molding-tools, of a hopper for holding the sole-blanks, and a reciprocating feed-plate and carrier-fingers adapted to take the blanks one at a time from the hopper and place it upon the mold automatically.

It further consists in combining with the molding-tool a suitable discharge mechanism, whereby the molded blank is automatically ejected therefrom.

It also relates to matters of construction in the operative mechanism, to be hereinafter fully described and specifically claimed.

In the accompanying drawings, Figure 1 is a plan of a machine constructed in accordance with my invention, the top mold being left off. Fig. 2 is a side elevation, partly in section, on the line *x x*, Fig. 1. Fig. 3 is a vertical sectional elevation of one of the molding-tools and the sole-ejecting mechanism, the same being detached from the machine. Fig. 4 is a detached perspective of the hopper and sole-feeding mechanism. Fig. 5 is a rear perspective view.

The side frames, A A, connected together by suitable rods, and the horizontal top plate, B, serve as a frame-work to uphold the operative parts of the machine. The driving-wheel C is mounted upon the horizontal shaft D, which shaft D is journaled in suitable boxes fixed in the side frames, A A, and has mounted thereon three grooved cams, designated respectively 1 2 3. The rods E E are arranged to slide vertically in suitable bearings, 4, attached to the inner side of the frames A A. Said rods are provided with a yoke or cross-head, F, fixed upon their top ends, and with a similar yoke or cross-head, G, upon their bottom ends, and connection is established therefrom with the cam 2 by means of the link 5 and toggle-arms 6 6, so as to cause a complete reciprocation of the rods by each revolution of the driving-shaft D. The link 5 is properly supported and held in position by means of the vertical link 7.

The molding-tools are constructed in the usual manner. The top or convex member is secured directly to the bottom of the cross-head F, and the bottom or concave members are secured upon the opposite side of the shaft 8, (see Fig. 3,) which shaft 8 is journaled in lugs 9 9, that extend upward from the table-plate B and in line with the cross-head F. On the end of shaft 8 is a pinion, 10, that engages with a larger pinion, 12, which pinion 12 is arranged to turn on the journal-pin 13, on which pin is also mounted the lever 14, between which and the pinion 12 is a ratchet-wheel, 15, which is secured to the pinion 12 and arranged to engage with one end of the pawl 16, the opposite end whereof is pivoted to the lever-arm 14. Connection is established between the said lever-arm 14 and the grooved cam 1 by means of the link 17 and elbow-lever 18, so as to half rotate the shaft 8 by each revolution of the driving-shaft D, and thus to present the molds *a* successively upward to the top member thereof, attached to the reciprocating cross-head F. Mounted upon the table-plate B are lugs *n n*, provided with horizontal grooves, in which is loosely fitted the plate *e*, and connection is established between the said plate *e* and the grooved cam 3 by means of the link 20 and the elbow-lever 21, whereby the plate is driven forward and back by each revolution of the driving-shaft D. Above the plate *e* are the angle-bars 22 22, mounted vertically upon the lugs *n n*, and made adjustable to and from each other by means of set-screw *r*, whereby they may be adjusted to fit the different sizes of sole-blanks. Said blanks, in order to be molded, are piled one above the other, and placed into the hopper thus formed by the angle-bars 22 22, the bottom member of the pile of blanks being allowed to rest upon the horizontal fingers *t t*, which fingers each have one end secured to the under side of the plate *e* and reach forward with the other end nearly or quite up to the mold *a*. The angle-bars 22 22 reach nearly or quite down to the plate *e*, and are cut away in front to permit the bottom member of the pile of sole-blanks to be pushed outward in that direction.

In operating this my improved sole-molding machine the sole-blanks are piled in the hopper one above the other, and gravitate downward till arrested by the bottom member of the pile coming against the fingers t t. When, now, the plate e is pushed forward by the revolving cam 3 it strikes with its front edge the said bottom member of the sole-blanks, and pushes the same forward through the opening in the hopper and bears it on the fingers t t to a portion directly over the female mold a, whereupon the cam 2, operating through its intermediate toggle-connection with the rods E E, forces downward the cross-head F sufficiently to allow the top member of the molds to press lightly upon the said blank, whereupon the downward movement of the cross-head is arrested, by reason of the formation of the cam 2, till the driving-shaft D has revolved sufficiently to cause the cam 3 to draw backward the plate e, and so remove the fingers t t, leaving the blank in the bite of the molds. Thereupon the downward movement of the cross-head is renewed, and the two molds are forced firmly together for the purpose of shaping the sole. This being accomplished, the cross-head is forced upward, and the cam 1, operating through its intermediate connection with the shaft 8, effects a semi-rotation of said shaft, thereby presenting upward the opposite member of the molds a to receive the next blank when pushed forward as before. Experience in molding soles has demonstrated the fact that the molded blank has a tendency to stick to the female mold, and ofttimes it refuses to leave the mold, even when the same is turned face downward. To obviate this difficulty I provide two female molds, which I mount upon the opposite sides of a revolving shaft, 8, and combine therewith the bolts u u, Fig. 3, which bolts pass through the said shaft and both molds, and are sufficiently long to permit of slight endwise movement therein, and the molds are countersunk to receive the bolt-heads when the same are pressed down. From this it will be evident that when pressure is applied to a blank in one mold for the purpose of molding the same it presses the bolts u u out through the face of the opposite mold, 1, so as to eject the sole. In this way the mold is sure to have discharged its molded blank before it comes up to receive another.

What I claim, and desire to secure by Letters Patent, is—

1. In a machine for molding soles, a reversible mold having an ejector, in combination with a male mold or follower and mechanism for presenting the opposite sides of the female mold alternately to the male mold.

2. The reversible mold a, mounted upon a shaft, and having the longitudinally-movable ejecting bolts or plungers a'.

3. In combination, the reciprocating plate e, having the fingers t t, with the adjustable hopper composed of plates 2 2.

4. In a sole-molding machine, the combination, with the molding-tools and mechanism for holding blanks, of the reciprocating plate e and finger-rods t t, whereon the blanks are severally transported from the hopper to the molds, substantially as described.

5. The combination of the shaft 8, having the molds a a mounted thereon, the pinions 10 and 12, the ratchet-wheel 15, the cam-wheel 2, and intermediate connecting-levers 18 17 14, and the pawl 16, all constructed and combined to operate substantially as set forth.

6. A machine for molding soles, consisting essentially of a vertically-reciprocating plunger or die, an intermittently-rotating reversible female mold, a hopper to receive the sole-blanks, a sliding feed-plate, a driving-shaft, and connecting mechanism, substantially as described, for effecting the automatic action of the said parts, all substantially as described.

Signed in presence of two witnesses.

SETH H. WOODBURY.

Witnesses:
H. A. THURLOW,
C. B. TUTTLE.